4 Sheets—Sheet 1.

P. CHALAS.
Combined Pepper Mill and Caster.

No. 210,837. Patented Dec. 17, 1878.

Witnesses:
1. 
2. Eugene Hébert

Inventor:
Pierre Chalas
A. v. Briesen
attorney

N. PETERS, PHOTO-LITHOGRAPHER, WASHINGTON, D. C.

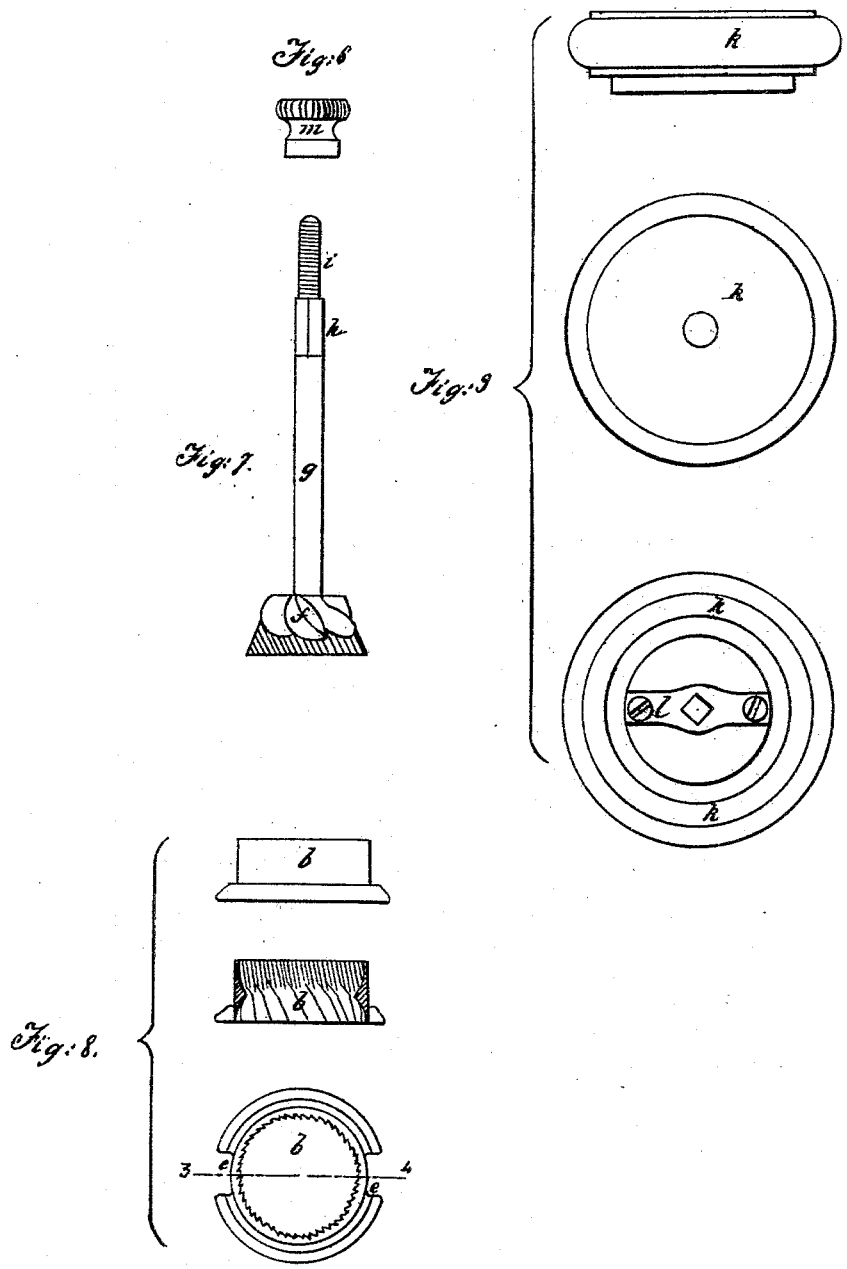
P. CHALAS.
Combined Pepper Mill and Caster.
No. 210,837. Patented Dec. 17, 1878.

4 Sheets—Sheet 3.
P. CHALAS.
Combined Pepper Mill and Caster.
No. 210,837. Patented Dec. 17, 1878.
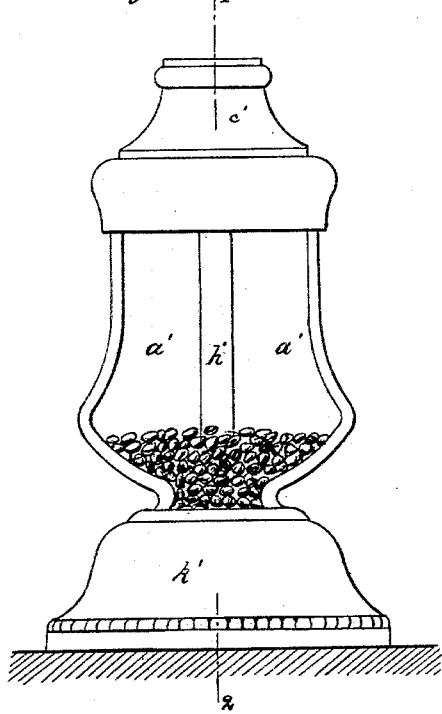
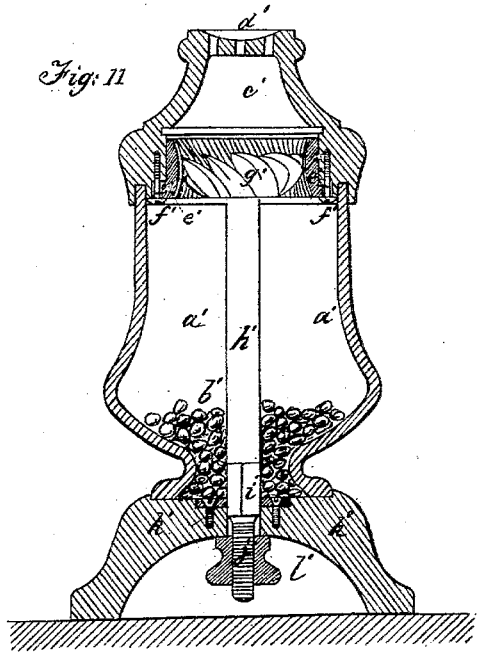
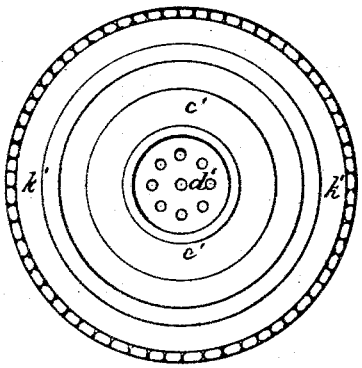
Witnesses:
Inventor:

4 Sheets—Sheet 4.

P. CHALAS.
Combined Pepper Mill and Caster.
No. 210,837. Patented Dec. 17, 1878.

Witnesses:

Inventor:

UNITED STATES PATENT OFFICE.

PIERRE CHALAS, OF VALENTIGNEY, FRANCE, ASSIGNOR TO PEUGEOT FRÈRES, OF SAME PLACE.

IMPROVEMENT IN COMBINED PEPPER-MILL AND CASTER.

Specification forming part of Letters Patent No. 210,837, dated December 17, 1878; application filed October 5, 1878.

*To all whom it may concern:*

Be it known that I, PIERRE CHALAS, of Valentigney, France, manufacturer, have invented Improved Combined Pepper-Mill and Caster; and I do hereby declare that the following is a full, clear, and exact description of the same, reference being had to the annexed sheets of drawing, making a part of the same.

This invention relates to a pepper-mill and caster combined, specially intended for use at table for grinding the pepper as required for consumption.

It consists of a small box of wood, metal, or other suitable material, of cylindrical or other convenient form externally, and having one or more apertures, through which the ground pepper is allowed to fall onto the dish or plate. It has no crank-handle for rotating the grinding-cone, this being effected by turning between the thumb and fingers the top or bottom of the mill itself, to which the grinding-cone is connected.

The annexed drawings show two examples of this invention. In the one the grinding-cone is operated by the top cover, and in the other by the bottom or foot of the mill.

Figure 1:
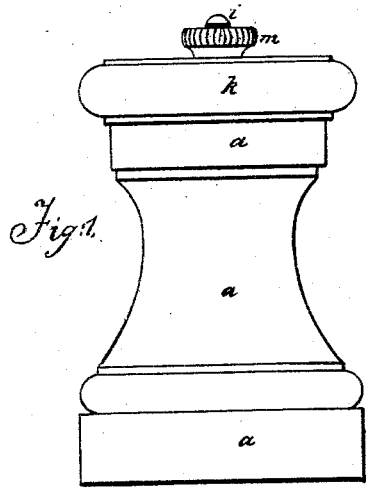
Figure 2:
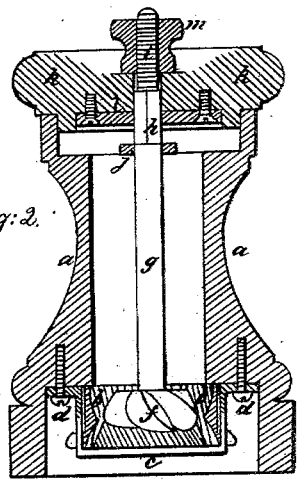
Figure 3:
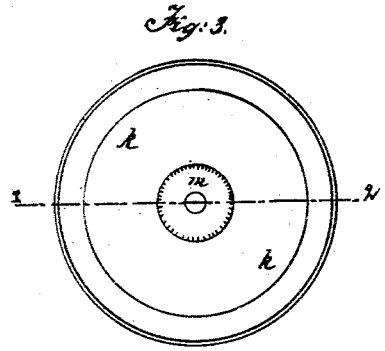
Figure 4:
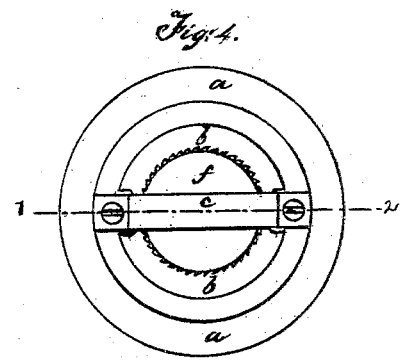
Figure 5:
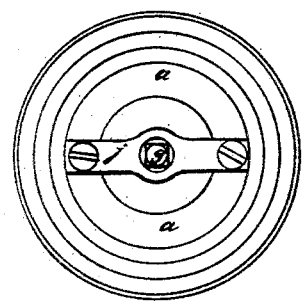

With special reference to Sheets 1 and 2, Figure 1 is an elevation; Fig. 2, a central vertical section on lines 1 2, Figs. 3 and 4. Fig. 3 is a top-plan, and Fig. 4 an under-side, view of the pepper-mill and caster, while Fig. 5 is a top view of the same with the rotary top removed. Figs. 6 and 7 show details of the grinding-cone and its axis; and Fig. 8 shows an elevation, a section on line 3 4, and a top view of the corresponding concave or grinding-cylinder; and Fig. 9 shows edge, top, and under-side views of the rotary top, by which the grinding-cone is operated.

In these nine figures the same letters of reference indicate the same parts.

$a$, box or case; $b$, concave or grinding-cylinder, fixed to the bottom of box $a$ by a stirrup-piece, $c$, received in notches $e$ in the bottom flange of the concave $b$, and secured to $a$ by screws $d$; $f$, grinding-cone, keyed on the lower end of spindle $g$, of which a part, $h$, at the upper end is square, and part $i$ screw-threaded, for connecting the spindle to the rotary top $k$. $j$ is a metal cross-bar, forming a bearing for spindle $g$, the round part of which passes through a round hole therein.

The top $k$ can turn freely on box $a$, and to its under side is attached a metal plate, $l$, having, as well as the top $k$, a square hole to receive the squared part $h$ of spindle $g$, the spindle and cover $k$ being secured together by the milled nut $m$, which also serves to regulate the distance between the grinding-surfaces of the cone $f$ and concave or cylinder $b$, in order to vary the fineness of the ground product.

In order to fill the mill and caster with pepper-corns, it is merely necessary to remove the top $k$ by unscrewing the nut $m$; or the top $k$ may have a hole, closed by a plug or otherwise, at which the pepper-corns can be introduced.

The bottom of box $a$ may be closed by a receptacle of sheet metal, forming a drawer.

In the second arrangement, illustrated in Sheets 3 and 4, the working parts are inverted, the rotary cover by which the grinding-cone is operated being now at bottom, and forming a foot or base for the mill and caster when not in use, while the grinding-cone and concave are now at the upper part of and inclosed by a cap pierced with holes.

To use the pepper-mill and caster, it is inverted like an ordinary pepper-caster, and when not in use it stands upright upon its foot or base, the holes being upward, so that the pepper cannot continue to escape therefrom when the mill is at rest, as might happen with the other arrangement.

Figure 13:
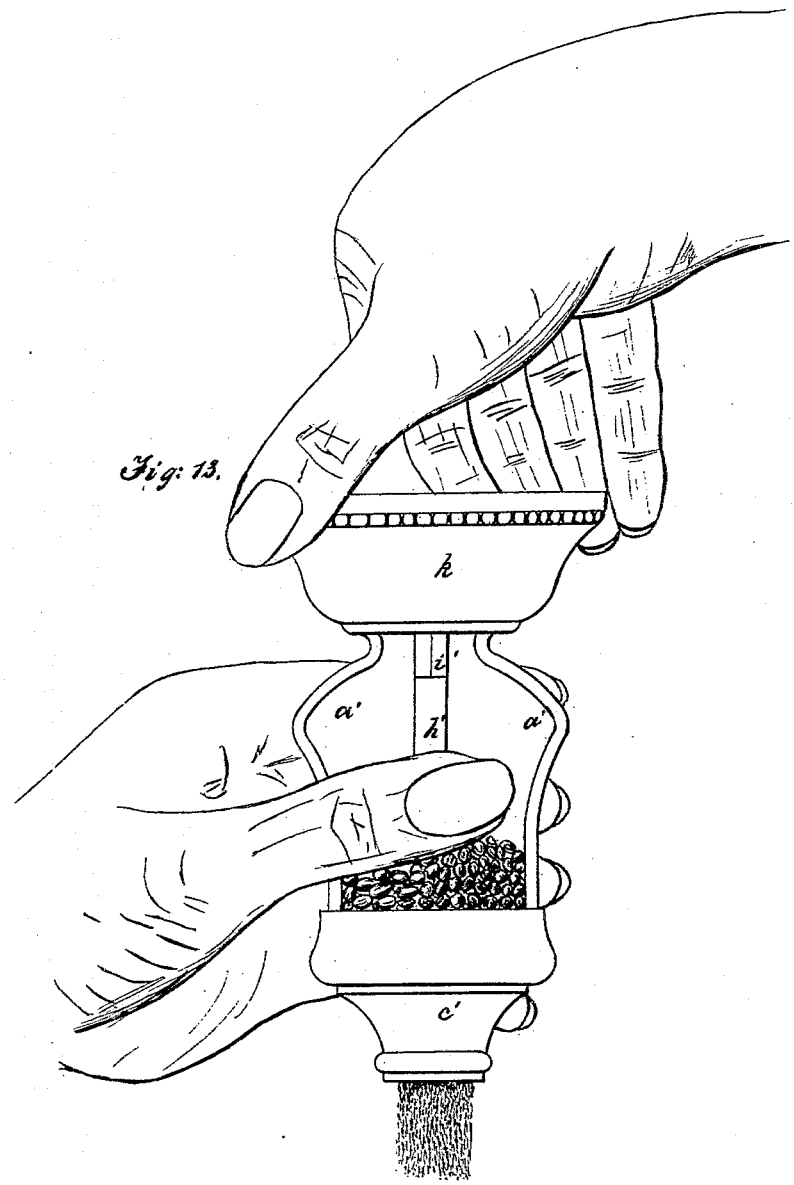

With special reference to Sheets 3 and 4, Fig. 10 is an elevation; Fig. 11, a vertical section on line 1 2, Fig. 10; and Fig. 12, a top view of the pepper-mill and caster. Fig. 13 shows the position of the same when in use.

The same letters indicate the same parts in these four figures.

$a'$, receptacle, of glass, wood, porcelain, metal, or other material, to hold the pepper-corns $b'$. $c'$ is a cap fixed on $a'$, pierced with holes $d'$; $e'$, concave or cylinder, fixed in $c'$ by screws $f'$; $g'$, cone, keyed on spindle $h'$; $i'j'$, square and screw-threaded parts of the latter; and $l'$, nut by which the foot $k'$ is fixed to spindle $h'$, as before.

The foot $k'$ turns freely on the lower rim of $a'$, and when the pepper-mill and caster is in use it is inverted, as in Fig. 13, and the foot $k'$ rotated in order to rotate the cone $g'$. The distance of the latter from the concave $e'$ is regulated by nut $l'$, as before.

To fill the receptacle $a'$, it is inverted, as in Fig. 13, and the foot $k'$ removed.

I claim—

A pepper-mill and caster for table use in which the grinding-cone is operated by rotating the top or bottom of the receptacle itself, substantially as shown and described.

PIERRE CHALAS.

Witnesses:
 ROBT. M. HOOPER,
 EUGÈNE HÈBERT.